United States Patent [19]

Iyer et al.

[11] Patent Number: 5,686,375
[45] Date of Patent: *Nov. 11, 1997

[54] HYDROPROCESSING CATALYST AND ITS USE

[75] Inventors: Pradeep S. Iyer, Pomona; Howard D. Simpson, Irvine; Suheil F. Abdo, Placentia, all of Calif.

[73] Assignee: UOP, Des Plaines, Ill.

[*] Notice: The term of this patent shall not extend beyond the expiration date of Pat. No. 5,389,595.

[21] Appl. No.: 313,723

[22] Filed: Sep. 27, 1994

Related U.S. Application Data

[63] Continuation-in-part of Ser. No. 130,109, Sep. 30, 1993, Pat. No. 5,389,595.

[51] Int. Cl.$^6$ ............................................. B01J 21/04
[52] U.S. Cl. ..................... 502/315; 502/211; 502/213; 502/215; 502/322; 502/335; 502/337
[58] Field of Search ........................ 502/315, 211, 502/213, 216, 322, 335, 337, 326

[56] References Cited

U.S. PATENT DOCUMENTS

| | | | |
|---|---|---|---|
| 2,983,691 | 5/1961 | Richardson | 252/453 |
| 3,285,860 | 11/1966 | Richardson | 252/465 |
| 3,617,528 | 11/1971 | Hilfman | 208/216 |
| 3,751,380 | 8/1973 | O'Hara | 252/439 |
| 3,770,610 | 11/1973 | Adams et al. | 208/216 |
| 3,853,788 | 12/1974 | Feins et al. | 252/455 R |
| 4,083,808 | 4/1978 | Mickelson | 252/455 R |
| 4,317,746 | 3/1982 | Richardson | 252/435 |
| 4,434,048 | 2/1984 | Schindler | 208/112 |
| 4,520,128 | 5/1985 | Morales et al. | 502/210 |
| 4,579,649 | 4/1986 | Morales et al. | 208/251 H |
| 4,729,980 | 3/1988 | Ramirez De Agudelo et al. | 502/221 |
| 4,738,944 | 4/1988 | Robinson et al. | 502/213 |
| 4,818,743 | 4/1989 | Simpson et al. | 502/211 |
| 4,846,961 | 7/1989 | Robinson et al. | 208/216 PP |
| 4,969,990 | 11/1990 | Simpson | 208/216 PP |
| 5,135,902 | 8/1992 | Delaney et al. | 502/210 |
| 5,277,794 | 1/1994 | Delaney et al. | 208/143 |
| 5,290,429 | 3/1994 | Delaney et al. | 208/145 |
| 5,403,806 | 4/1995 | Simpson | 502/211 |

FOREIGN PATENT DOCUMENTS

| | | | |
|---|---|---|---|
| 0092878A2 | 11/1983 | European Pat. Off. | B01J 23/74 |
| 2055599A | 3/1981 | United Kingdom | B01J 23/88 |

*Primary Examiner*—Glenn A. Caldarola
*Assistant Examiner*—Bekir L. Yildirim
*Attorney, Agent, or Firm*—Thomas K. McBride; John G. Tolomei; John G. Cutts, Jr.

[57] ABSTRACT

A catalyst containing an overlayer of a catalytic promoter on a porous refractory support containing an underbedded Group VIII metal-containing component. The catalyst is prepared by sequential incorporation of the Group VIII metal followed by the additional catalytic promoter component, usually a Group VIB metal, with the porous refractory oxide support. Underbedded nickel components on the catalyst are characterized by a unique Raman spectrum exhibiting Raman bands in the region of about 240 cm$^{-1}$ to about 250 cm$^{-1}$ and in the region of about 595 cm$^{-1}$ to about 605 cm$^{-1}$. The catalyst has a MoO$_3$/NiO weight ratio less than 6 to 1 and more than 4 weight percent of NiO. The catalyst is especially useful for simultaneous hydrodenitrogenation and hydrodesulfurization of a gas oil, particularly when the refractory oxide support has a narrow pore size distribution.

18 Claims, 1 Drawing Sheet

FIG. 1

HYDROPROCESSING CATALYST AND ITS USE

RELATED APPLICATIONS

This application is a continuation-in-part application of U.S. patent application Ser. No. 08/130,109, filed Sep. 30, 1993, now U.S. Pat. No. 5,389,595 the disclosure of which is incorporated by reference in its entirety herein.

BACKGROUND OF THE INVENTION

The invention relates to a hydroprocessing catalyst, its method of preparation and its use for hydroprocessing hydrocarbon-containing oils.

During catalytic hydroprocessing, particulate catalysts are utilized to promote reactions such as desulfurization and denitrogenation. This is accomplished by contacting the particulate catalysts with a feedstock, such as a gas oil, under conditions of elevated temperature and pressure and in the presence of hydrogen so that the sulfur components are converted to hydrogen sulfide, and nitrogen components to ammonia. Hydroprocessing is typically employed to reduce the concentration of nitrogen and sulfur in feedstocks so as to produce hydrocarbons which, when eventually combusted, result in reduced air pollutants of the forms $NO_x$ and $SO_x$. Reducing the concentration of nitrogen is also desirable to protect other refining catalysts, such as hydrocracking catalysts, which deactivate in the presence of nitrogen.

A typical hydroprocessing catalyst contains hydrogenation metals and/or other promoters on a porous refractory oxide support. Hydrogenation metals usually include Group VIB and/or Group VIII active metal components supported on a porous refractory oxide support such as alumina. Other promoters, such as phosphorus components, have also been incorporated in such catalysts. Such catalysts are often prepared by impregnation, that is, the deposition of the active components on the support base by contact thereof with an aqueous solution containing the active components in dissolved form. The impregnated supports are usually calcined, thus converting the promoters to the oxide form, and then the catalyst is activated for use.

An important and continuing aim—in the catalyst refining art—is to discover catalysts of improved activity and/or stability. Increasing the activity of a catalyst increases the rate at which a chemical reaction proceeds under given conditions, and increasing the stability of a catalyst increases its resistance to deactivation, that is, the useful life of the catalyst is extended. In general, as the activity of the catalyst is increased, the conditions required to produce a given end product, such as a hydrocarbon of given sulfur or nitrogen content, becomes more mild. Milder conditions require less energy to achieve a desired product, and the catalyst's life is extended due to such factors as lower coke formation, etc.

Modest or slight variations in compositional characteristics or methods of preparation of hydroprocessing catalysts have been known to have highly unpredictable activity or stability effects on hydrocarbon conversion reactions (such as denitrogenation and/or desulfurization reactions). Three such variable compositional characteristics are: (1) porosity characteristics of the catalyst derived from its porous refractory oxide support; (2) the actual hydrogenation metal promoters (Ni, Co, Mo, W, etc.) and other promoters (P, etc.) in the catalysts; and (3) the percentages of the promoters in the catalyst. Variations of catalyst preparation include impregnation, comulling, coprecipitation, and cogellation.

The petroleum refiner must balance economic considerations, such as the cost of catalyst preparation, with the catalyst characteristics affecting catalyst activity and/or stability. One group of hydroprocessing catalysts providing suitable service to petroleum refiners for hydrodenitrogenation (in terms of both activity and economics) contain nickel, molybdenum and phosphorus promoters (commonly called "Ni—P—Mo" catalysts) supported on porous refractory oxides having a wide variety of pore size distributions. Each variation in porosity can impart a significant variation in catalyst properties, even for Ni—P—Mo catalysts containing the same relative weight percentages of promoters. Similarly, small variations in the percentages of Ni—P—Mo promoters can alter catalyst properties substantially. Furthermore, slight modifications in catalyst preparation procedures, such as the manner of incorporating the Ni—P—Mo promoters with the refractory oxide supports, or the effective calcination temperature, can likewise unpredictably affect catalyst activity and/or stability properties.

A commercial Ni—P—Mo catalyst having a specific narrow pore size distribution and at least 24.5 weight percent of molybdenum components, calculated as $MoO_3$, has been useful in hydroprocessing hydrocarbon oils. However, molybdenum is relatively expensive and its relatively high weight percentage contributes significantly to the costs of the commercial hydroprocessing catalyst, and ultimately to the cost of hydroprocessing with the catalyst. A relatively small reduction in the weight percentage of molybdenum on a catalyst can result in huge cost savings to the petroleum refiner. On the other hand, nickel is considerably cheaper than molybdenum, and an increase in the weight percentage of nickel on a catalyst becomes economically viable, provided activity and/or stability effects outweigh an increase in cost of manufacture of the catalyst. Accordingly, the petroleum refiner or catalyst manufacturer has a keen economic interest in a catalyst containing a reduced amount of costly molybdenum when improved catalyst activity and/or stability effects can be achieved with moderate increases in nickel content in the catalyst.

SUMMARY OF THE INVENTION

The invention provides for a catalyst useful for hydroprocessing hydrocarbon-containing oils and a method for preparing such a catalyst by employing multiple impregnation and calcination steps. In one embodiment, the catalyst is prepared by first producing a calcined particulate containing a Group VIII metal component and a porous refractory oxide, and subsequently contacting at least one additional catalytic promoter component, such as a Group VIB metal component, with the calcined particulate, and then re-calcining the Group VIB/promoter-containing composition. The finished catalyst contains an overlayer of the catalytic promoter on a support comprised of an "underbedded" Group VIII metal component combined (bound, as by calcination) with a porous refractory oxide. The method is particularly effective for preparing more highly active catalysts having a relatively high percentage of both Group VIII metal components (i.e., greater than 3.0 wt. % as the monoxide) and Group VIB metal components (i.e., greater than about 17 weight percent as the trioxide).

In a preferred embodiment, a nickel-molybdenum-phosphorus-alumina-containing hydroprocessing catalyst having a narrow pore size distribution contains above 3.0, and preferably above 4.0 weight percent of nickel components (calculated as NiO) and greater than about 18 weight percent of molybdenum components (calculated as $MoO_3$). Prior to incorporation of molybdenum and/or phosphorus components during catalyst preparation, a calcined nickel/alumina particulate contains at least 20 percent of the nickel components contained in the finished catalyst. Such nickel components are incorporated into and/or supported on the alumina-containing support during a calcination step at a temperature above about 850° F.

A distinguishing feature of the preferred catalyst of the invention is the Raman spectra of the finished catalyst. The catalyst, containing underbedded nickel, is characterized by a Raman spectrum having at least one Raman band shift frequency (i.e., Raman band) in the region of about 240 delta $cm^{-1}$ (i.e., $cm^{-1}$) to about 250 $cm^{-1}$ and at least one Raman band in the region of about 595 $cm^{-1}$ to about 605 $cm^{-1}$. The Raman spectrum of the catalyst normally has additional Raman bands in the regions of about 365 $cm^{-1}$ to about 375 $cm^{-1}$ and about 455 $cm^{-1}$ to about 465 $cm^{-1}$. Also, the nickel/molybdenum-containing catalyst is characterized by a Raman spectrum having at least two, and often at least three Raman bands in the regions of about 880 $cm^{-1}$ to about 1,025 $cm^{-1}$. The second derivatives of such Raman spectra, i.e., second derivative Raman bands, better discern the Raman bands by enhancing the resolution of weaker or overlapping Raman bands in the spectrum of the catalyst.

The hydroprocessing catalyst of the invention is particularly effective for promoting reactions resulting in simultaneous hydrodenitrogenation and hydrodesulfurization of hydrocarbon oils. Also, the preparation method of the invention allows a catalyst manufacturer to include a smaller weight percentage of relatively expensive Group VIB metal components in a hydroprocessing catalyst to achieve excellent activity and/or stability.

DETAILED DESCRIPTION OF THE INVENTION

The invention is directed to a novel catalyst containing "underbedded" Group VIII metal hydrogenation components, a novel method of preparation of the catalyst, and a novel process for converting a hydrocarbon-containing feedstock to upgraded hydrocarbon products. In a preferred embodiment, denitrogenation and desulfurization reactions are promoted by a catalyst comprising underbedded nickel and at least a partial overlayer of molybdenum (or other Group VIB metal) and/or phosphorus components supported on a porous refractory oxide.

The catalysts employed in the present invention are prepared by first preparing a calcined porous refractory oxide particulate containing Group VIII metals and then incorporating at least one additional catalytic promoter thereafter, such as Group VIB metals and phosphorus, thus producing catalysts containing underbedded Group VIII metals. A preferred catalyst contains above 3 weight percent of Group VIII metals, calculated as the monoxide. The terms "underbedded Group VIII metals" and "underbedded nickel" refer respectively to hydrogenation metal promoter materials, and nickel specifically, which have been (1) calcined with a support material or precursors of such support material at a temperature greater than 500° F. for at least 0.25 hours, and (2) subsequently contacted with additional catalytic promoter material (which may optionally include more of the same and/or different Group VIII metal components) and again calcined at a temperature greater than 500° F. for at least 0.25 hours. Additional catalytic promoter components subsequently calcined with the calcined Group VIII metal-containing particulate include virtually any material known to be catalytically active when supported on or contained in a porous refractory oxide, and can include more of the same Group VIII metal contained in the Group VIII metal-containing calcined particulate. The term "overlayer" refers to the additional catalytic promoter material, particularly molybdenum and/or phosphorus, being located on the calcined Group VIII metal-containing support.

Preferably the catalyst of the present invention is essentially free of supported metal components other than molybdenum and underbedded nickel. The preferred catalyst of the invention consists essentially of molybdenum, phosphorus, and underbedded nickel components supported on the herein described supports. In a more highly preferred catalyst of the invention, the catalyst consists essentially of molybdenum, phosphorus, underbedded nickel components, and additional catalytic nickel promoter components. In the most highly preferred embodiment, the finished catalyst contains above 3 weight percent of nickel components, including underbedded nickel components encompassing at least 4.5 weight percent of the support.

In the preparation of the catalysts of the present invention, the pore size distribution of the porous support particles may be similar to that of the final catalyst, but such is not necessary or critical. The support material is typically comprised of such porous inorganic refractory oxides as silica, magnesia, silica-magnesia, zirconia, silica-zirconia, titania, silica-titania, alumina, silica-alumina, alumino-silicate, etc. with supports containing gamma alumina being highly preferred. Preferably, the supports are amorphous and essentially free of crystalline materials and, most particularly, are essentially free of crystalline molecular sieve materials. Preferred support particles having the preferred physical characteristics disclosed herein are available from Nippon-Ketjen Catalyst Division of AKZO Chemicals, and Criterion Catalyst Company. Mixtures of the foregoing oxides are also contemplated, especially when prepared as homogeneously as possible. Among the useful catalyst materials in the present invention are the supports disclosed in U.S. Pat. Nos. 4,686,030 issued to Ward, 4,846,961 issued to Robinson et al., 4,500,424 issued to Simpson et al., and 4,849,093 issued to Vauk et al., herein incorporated by reference in their entireties.

The porous refractory oxide support material is usually prepared in the form of shaped particulates, with the preferred method being to extrude a precursor of the desired support (such as a hydrated alumina) through a die having openings therein of desired size and shape, after which the extruded matter is cut into extrudates of desired length. The support particles may also be prepared by mulling (or pulverizing) a precalcined amorphous refractory oxide to a particle size less than about 100 microns and extruding the material.

The extruded particles may have any cross-sectional shape, i.e., symmetrical or asymmetrical, but most often have a symmetrical cross-sectional shape, preferably a cylindrical or polylobal shape. The cross-sectional diameter of the particles is usually about 1/40 to about 1/8 inch, preferably about 1/32 to about 1/12 inch, and most preferably about 1/24 to about 1/15 inch. Among the preferred particles are those having quadralobal cross-sectional shapes resembling that of a four leaf clover, including asymmetrical shapes as well as symmetrical shapes such as in FIG. 1 of U.S. Pat. No. 4,028,227. Other preferred catalyst configurations are cross-sectional shapes resembling that of a three-leaf clover, as shown, for example, in FIGS. 8 and 8A of U.S. Pat No. 4,028,227. Preferred clover-shaped particles are such that each "leaf" of the cross-section is defined by about a 270° arc of a circle having a diameter between about 0.02 and 0.05 inch. Other particles having ring and minilith shapes are available from Davison Chemical Company, a division of W. R. Grace & Company, as disclosed in U.S. Pat. No. 4,510,261.

Typical characteristics of the amorphous porous refractory oxide supports utilized herein are a total pore volume, median pore diameter and surface area large enough to provide substantial space and area to deposit the active metal components. The total pore volume of the preferred support, as measured by conventional mercury porosimeter methods, is usually about 0.2 to about 2.0 cc/gram, preferably about 0.25 to about 1.0 cc/gram, and most preferably about 0.3 to about 0.9 cc/gram. Surface area (as measured by the B.E.T. method) is typically above about 100 m$^2$/gram, and preferably about 125 m$^2$/gram to about 400 m$^2$/gram. In the broadest sense, the preferred support has a median pore diameter greater than about 50 angstroms, and preferably about 60 to about 100 angstroms. One preferred support has a narrow pore size distribution (as measured by mercury porosimetry) wherein at least about 75 percent, and preferably at least 80 percent of the total pore volume is in pores of diameter from about 20 angstroms above to about 20 angstroms below the median pore diameter. The support preferably has less than about 20 percent of the total pore volume in pores of diameter less than about 60 angstroms and less than about 5 percent of the total pore volume in pores of diameter less than about 50 angstroms, and less than about 20 percent, preferably less than 15 percent of the total pore volume is in pores of diameter greater than about 90 angstroms. Physical characteristics of several amorphous refractory oxide supports utilized in preparation of a catalyst employed in the process of the invention are summarized in Table A as follows:

TABLE A

| Pore Diameter Angstroms | Support T % Pore Volume | Support U % Pore Volume | Support V % Pore Volume | Support W % Pore Volume |
| --- | --- | --- | --- | --- |
| 40–50 | — | 1.6 | 4.0 | 0.9 |
| <50 | 0.8 | 1.9 | — | 1.2 |
| 50–60 | 5.7 | 4.2 | 16.0 | 1.8 |
| 60–70 | 16.4 | 22.5 | 46.0 | 6.1 |
| 70–80 | 29.9 | 61.1 | 28.0 | 21.2 |
| >80 | — | 10.3 | 6.0 | 69.7 |
| 80–90 | 24.6 | 4.1 | — | 55.0 |
| >90 | — | 6.2 | — | 14.7 |
| 90–100 | 9.8 | 0.7 | — | 8.6 |
| 100–110 | 6.6 | 0.6 | — | 0.8 |
| 110–120 | 1.6 | 0.4 | — | 0.5 |
| 120–130 | 0.8 | 0.4 | — | 0.3 |
| >130 | 5.7 | 4.1 | — | 4.5 |
| PORE VOLUME cc/gram (Merc. Poros.) | 0.61 | 0.61 | 0.58 | 0.66 |
| MEDIAN PORE DIAMETER (Merc. Poros.) | 80 | 73 | 67 | 83 |

In the preparation of the catalyst of the invention, a porous refractory oxide or its precursor is first combined and calcined with at least one source of Group VIII metal component. The Group VIII metal component can be either a noble or non-noble metal, although non-noble metals are preferred. The Group VIII metal is usually selected from the group consisting of ruthenium, platinum, palladium, cobalt, nickel and iron, with nickel being the most highly preferred.

The combined Group VIII metal and porous refractory oxide composition is calcined for a sufficient time at a temperature from about 500° F. to about 1,500° F., but preferably above about 850° F. and most preferably in the range from about 900° to about 1,200° F. It is highly preferred that the resulting calcined particulates consist essentially of Group VIII metals and porous refractory oxide supports, and that no additional catalytic promoters, such as phosphorus, be contained on the supports.

The calcined particulate containing at least one Group VIII metal component and the porous refractory oxide is subsequently contacted and further calcined with at least one source of additional catalytic promoter material. Preferred additional catalytic promoter materials include phosphorus, titanium, zirconium, hafnium, vanadium, manganese, magnesium, calcium, lanthanum, copper, Group VIB metals including chromium, molybdenum and tungsten, as well as more of the same Group VIII metal as contained in the Group VIII metal-containing calcined particulate or different Group VIII metals. Preferred Group VIII metals include cobalt, nickel and iron. Highly preferred additional catalytic promoter materials contain one or more Group VIB metals, with molybdenum being most preferred. The composition containing additional catalytic promoter combined with Group VIII metal-containing calcined porous refractory oxide is normally calcined for a sufficient time at a temperature from abut 500° F. to about 1,000° F., but preferably below about 1,050° F., and most preferably in the range from about 600° F. to about 1,000 F. Typically, the time of all calcination steps disclosed herein is at least 0.25 hours, preferably at least 0.5 hours, and more preferably at least one hour.

An unusual feature of the invention is the porosity of the calcined particulate consisting essentially of the Group VIII metal and the porous refractory oxide. Compared to the porous refractory oxide without the Group VIII metal, the calcined Group VIII metal-containing porous refractory oxide particulate has essentially the same pore size distribution for pores of diameter greater than 75 angstroms. The term "essentially the same pore size distribution" refers to pores of diameter of at least 75 angstroms in the pore size distribution of the support without Group VIII metal being measured within 5 angstroms (by mercury porosimetry) of the pore diameters of the Group VIII metal-containing support at any corresponding and equal amount of pore volume in each pore size distribution. In other words, on a plot of pore volume, in cc/gram (on ordinate), vs. pore size diameter, in angstroms (on abscissa), the resulting pore size distribution curves of the two plots (one for the calcined support alone and one for the calcined Group VIII metal-containing support) in pores of diameter above 75 angstroms can be congruently superimposed (within a pore diameter deviation of 5 angstroms).

To prepare a preferred catalyst, the support material is first compounded with one or more precursors of catalytically active nickel and then calcined at a temperature above 850° F., and preferably from about 1,000° F. to about 1,200° F. Secondly, the resultant calcined nickel/support composition is contacted with a precursor of a molybdenum hydrogenation metal component and, optionally, but preferably, also with precursors of a phosphorus component. The product composition containing the calcined nickel/support, molybdenum, and (optionally) phosphorus, is then dried and calcined from about 650° F. to about 1,000° F.

The compounding of the Group VIII metals with the support is usually achieved by impregnation and calcination techniques. The impregnations and calcinations may be accomplished by several methods, as for example, by spray impregnation wherein a solution containing the metal precursors in dissolved form is sprayed onto the support particles. Another method is the circulation or multi-dip procedure wherein the support material is repeatedly contacted with the impregnating solution with or without intermittent drying. Yet another method involves soaking the support in a large volume of the impregnation solution, and yet one more method is the pore volume or pore saturation technique wherein support particles are introduced into an impregnation solution of volume just sufficient to fill the pores of the support. On occasion, the pore saturation technique may be modified so as to utilize an impregnation solution having a volume between 10 percent less and 10 percent more than that which will just fill the pores.

In the method of the invention, many nickel and molybdenum compounds are useful for impregnation or comulling. Preferred compounds include nickel nitrate, nickel acetate, nickel chloride, nickel carbonate and precursors of molybdenum trioxide, such as ammonium dimolybdate and preferably ammonium heptamolybdate. Preferred phosphorus compounds comprise an acid of phosphorus, such as meta-phosphoric acid, pyrophosphoric acid, phosphorous acid, but preferably orthophosphoric acid ($H_3PO_4$), or a precursor of an acid of phosphorus, that is, a phosphorus-containing compound capable of forming a compound containing at least one acidic hydrogen atom when in the presence of water, such as phosphorus oxide, phosphorus, or the like.

In the preferred embodiment, impregnation of the porous refractory support with a source of nickel is accomplished using a single separate impregnation solution for nickel components. Such an impregnation solution typically contains essentially no source of phosphorus or molybdenum components. After formation of the calcined nickel/porous refractory oxide support, the other promoter materials may be wholly or partially sequentially impregnated with intervening drying and calcining. If the Group VIB metal and phosphorus precursors are incorporated by impregnation, a subsequent or second calcination at temperatures between about 500° F. and about 1,200° F., converts the Group VIB metals and phosphorus to their respective oxide forms. Calcinations may follow each impregnation of individual promoters. However, some multiple impregnation-calcination procedures may be avoided in alternative embodiments of the invention, as for example, by first comulling the source of nickel metal with the support materials, calcining, and then comulling the molybdenum and phosphorus promoters with the support materials rather than impregnating the metals thereon. In comulling, precursors of the support materials, usually in a hydrated or gel form, are admixed with precursors of the nickel metal component, either in solid form or in solution, to produce a paste suitable for shaping by known methods, e.g., pelleting, extrusion, etc. A subsequent calcination yields a catalyst containing the active metals and phosphorus in their respective oxide forms.

When the catalyst is prepared by the foregoing or equivalent methods, at least one active Group VIII metal and Group VIB metal (preferably nickel and molybdenum metal) component having hydrogenation activity and phosphorous component are introduced into the catalyst. The catalyst typically contains greater than 3.0, preferably greater than 4.0, and most preferably greater than 4.5 weight percent of Group VIII metal component (calculated as the monoxide) and greater than 10, and preferably greater than 17 weight percent of Group VIB metal component (calculated as the trioxide). In a preferred embodiment, the catalyst contains about 0.5 to about 15 percent, usually above 3.0 percent and normally from 4.1 to 13 percent, and preferably above 5 percent by weight of nickel, calculated as NiO, and about 1 to about 40 percent, usually from about 3 to about 35 percent, and preferably from 17 to 27 percent by weight of molybdenum, calculated as $MoO_3$. A highly preferred catalyst useful herein contains about 17 to about 30 weight percent, and more preferably about 22 to about 25 weight percent of molybdenum components, calculated as $MoO_3$, and from about 4.5 to about 13 weight percent of nickel components, calculated as NiO. The catalyst contains a phosphorus component, ordinarily supported on the catalyst, which phosphorus component may provide acid properties to the catalyst or act as a catalytic promoter. Typically, the catalyst contains above 0.1 and usually about 0.5 to about 15 weight percent of phosphorus components, calculated as P.

The preferred Ni—P—Mo catalyst of the invention provides higher hydroprocessing catalytic activity for an equivalent amount of molybdenum than comparative molybdenum-containing catalysts. It has been observed in the petroleum refining industry that a Ni—P—Mo commercial catalyst containing nominally 24.5 weight percent of $MoO_3$ components, 4.0 weight percent of NiO components and 6.8 weight percent of $P_2O_5$ components (3.0 weight percent, calculated as P) has been effective in hydroprocessing hydrocarbon oils, and that increased amounts of nickel components, particularly above 4 weight percent (NiO), on such a catalyst has been detrimental to hydroprocessing catalytic activity. Such a catalyst, as is typical of most relatively high weighted molybdenum-containing commercial Ni—P—Mo catalysts, is ordinarily prepared by a method wherein essentially all the catalytic promoter components are incorporated with the support material in a single step, such as a single impregnation of nickel, molybdenum and phosphorus components onto the porous refractory support followed by calcination. The weight percentage ratio of molybdenum-to-nickel on such a finished Ni—P—Mo catalyst, calculated as the percentage weights (in grams) of metal oxides (i.e., $MoO_3$, NiO) on the calcined finished catalyst, is greater than 6 to 1. In contrast, the finished catalyst of the present invention has a weight percentage of molybdenum-to-nickel (calculated as $MoO_3$ and NiO) less than 6 to 1, preferably less than about 5.5 to 1, and more preferably less than 4 to 1. Typically the molybdenum-to-nickel weight percentage ratio is in the range from about 5.8 to about 2.5 to 1. A molybdenum-to-nickel weight percentage ratio of less than about 5.8 provides superior denitrogenation and desulfurization activity for the catalyst of the invention as compared to a comparable nickel/molybdenum/phosphorus catalyst having a higher molybdenum-to-nickel weight percentage ratio as well as essentially the same number of moles of molybdenum and phosphorus and prepared by single impregnation of the Ni—P—Mo on a support having essentially the same pore size distribution. Also, the nickel/molybdenum-containing catalyst of the invention usually contains at least about 5 percent less weight of molybdenum than the weight of molybdenum contained on an equally weighted portion of the earlier-described Ni—P—Mo commercial catalyst. The nickel/molybdenum-containing catalyst usually contains a factor of at least 1.025 times more weight of nickel than the weight of nickel contained on an equally weighted portion of the commercial catalyst.

The Raman spectral characteristics of the preferred catalyst exhibit Raman bands that distinguish the catalyst from catalysts that do not contain underbedded nickel components. The resultant calcined nickel/support composition described hereinbefore is characterized by a Raman spectrum having a Raman band in the region of about 240 cm$^{-1}$ to about 250 cm$^{-1}$, and preferably 241 cm$^{-1}$ to about 248 cm$^{-1}$. The preferred catalyst has a Raman spectrum characterized by the unique combination of at least one Raman band in the region of about 240 cm$^{-1}$ to about 250 cm$^{-1}$ and at least one other Raman band in the region of about 595 cm$^{-1}$ to about 605 cm$^{-1}$. The bands exhibited by the catalyst in such regions, as measured by Conventional laboratory Raman spectrometers (such as a Spex Ramalog 1403 spectrometer), typically have a deviation of about 5 cm$^{-1}$ below to about 5 cm$^{-1}$ above (i.e., ±5 cm$^{-1}$) the measured value. The catalyst also exhibits a Raman band in the region of about 365 cm$^{-1}$ to about 375 cm$^{-1}$ and another in the region of about 455 cm$^{-1}$ to about 465 cm$^{-1}$.

The catalyst of the invention is further characterized by a Raman spectrum comprising at least two, and preferably at least three, and most preferably at least four Raman bands in the region from about 880 cm$^{-1}$ to about 1,025 cm$^{-1}$ and preferably at least two Raman bands in the region from about 940 cm$^{-1}$ to about 1,010 cm$^{-1}$. Nickel-molybdenum-phosphorus catalysts are characterized by Raman spectra having a unique combination of at least one Raman band in each of the following regions: about 240 cm$^{-1}$ to about 245 cm$^{-1}$, 365 cm$^{-1}$ to about 375 cm$^{-1}$, 455 cm$^{-1}$ to about 465 cm$^{-1}$, 595 cm$^{-1}$ to about 605 cm$^{-1}$, 825 cm$^{-1}$ to about 835 cm$^{-1}$, 885 cm$^{-1}$ to about 895 cm$^{-1}$, 945 cm$^{-1}$ to about 965 cm$^{-1}$, 970 cm$^{-1}$ to about 980 cm$^{-1}$ and 990 cm$^{-1}$ to about 1,000 cm$^{-1}$. A highly preferred catalyst is further characterized by at least one weak Raman band in each of the regions of about 215 cm$^{-1}$ to about 225 cm$^{-1}$, about 295 cm$^{-1}$ to about 305 cm$^{-1}$, and about 435 cm$^{-1}$ to about 445 cm$^{-1}$. Furthermore, the catalyst is characterized by essentially no combination of Raman bands in the regions of 232 cm$^{-1}$±5 cm$^{-1}$ and 250 cm$^{-1}$±5 cm$^{-1}$. Second derivatives of the foregoing Raman spectra, i.e., second derivative Raman bands, preferentially enhance the resolution of the weaker Raman bands, especially when the bands overlap with broader bands and/or are subject to baseline shifts or distortions. In other words, second derivative Raman bands in the regions disclosed herein more sharply define the Raman band shift frequencies.

Figure 1:
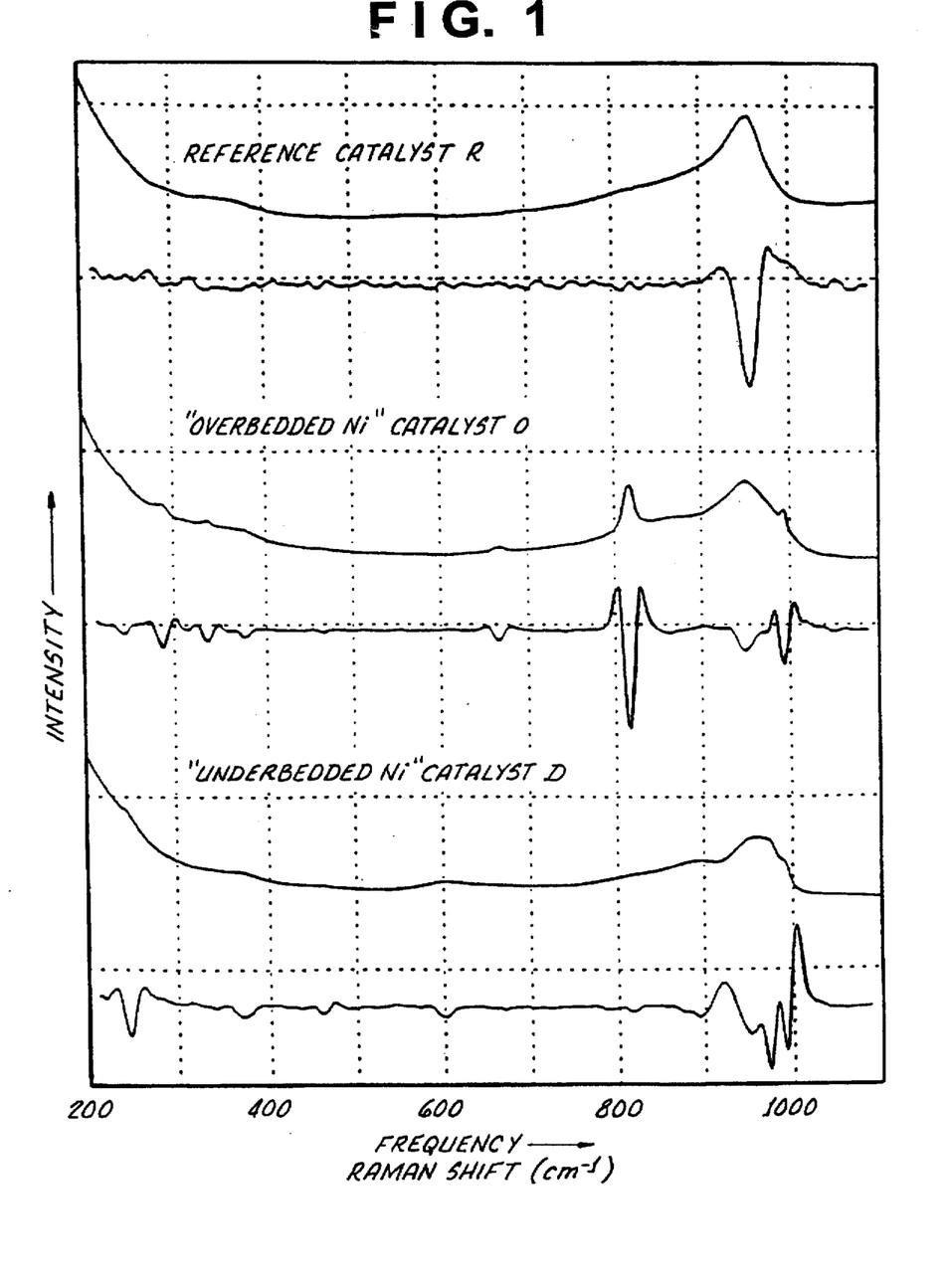
FIG. 1 shows Raman spectra of three different catalyst compositions along with the corresponding second derivative spectral plots shown immediately below their corresponding Raman spectrum. The top and middle spectra (and second derivatives thereof) are those of reference catalysts whereas the bottom spectrum (and second derivative thereof) is that of a catalyst of the invention. Increased intensities are scaled upward in arbitrary units in each Raman spectrum on the ordinate. Frequencies are scaled on the abscissa in the range from approximately 200 $cm^{-1}$ to approximately 1,100 $cm^{-1}$.

As disclosed hereinafter in Example 2 and in FIG. 1, the above-mentioned Ni—P—Mo commercial catalyst (designated as commercial Catalyst R in the Examples), prepared by incorporating the nickel components into the catalyst simultaneously with the other catalytic promoters (i.e., molybdenum and phosphorus), has a Raman spectrum which does not meet the unique combination of Raman bands of the catalyst of the invention. The Ni—P—Mo commercial catalyst is characterized by one strongly intense Raman band in the region of about 956 cm$^{-1}$ and no Raman bands in the region of about 400 cm$^{-1}$ to about 640 cm$^{-1}$. Furthermore, a catalyst containing essentially all its nickel components in an overlayer of the catalytic promoter components has a Raman spectrum (as shown in FIG. 1) which does not meet the unique combination of Raman bands of the catalyst of the invention. For instance, catalysts containing no underbedded nickel components, but containing nickel components in the overlayer and molybdenum components in the underbedded layer, are characterized by Raman spectra having a Raman band of strong intensity in the region from 810 cm$^{-1}$ to 820 cm$^{-1}$ (which is indicative of crystalline MoO$_3$ formation) and no Raman bands in the region of about 400 cm$^{-1}$ to about 640 cm$^{-1}$.

The porosity characteristics of the preferred catalyst (as measured by mercury porosimetry) usually vary from those of the support particles due to the additional hydrogenation metals and other promoters contained in the catalyst composition. Ordinarily, the catalyst is prepared so as to have a narrow pore size distribution wherein at least about 75 percent, and preferably at least about 80 percent of the total pore volume is in pores of diameter from about 50 to about 130 angstroms. The catalyst usually has greater than 80 percent of the total pore volume in pores of diameter less than 115 angstroms and greater than 60 percent of the total pore volume in pores of diameter less than 110 angstroms. Ordinarily the catalyst has less than about 10 percent of the total pore volume in pores of diameter below about 50 angstroms and preferably less than about 0.05 cc/gram. Also, the catalyst has less than about 10, and most preferably less than 6 percent of the total pore volume in pores of diameter greater than about 130 angstroms, preferably less than about 0.05 cc/gram in such range; and preferably less than 25 and most preferably less than 20 percent of the total pore volume is in pores of diameter greater than 115 angstroms. It is also preferred that at least 9 percent of the total pore volume be in pores of diameter less than 80 angstroms; and most preferably, at least about 10 percent of the total pore volume in pores of diameter less than 90 angstroms.

The median pore diameter of the catalyst usually lies in the range from about 60 to about 120 angstroms, preferably 70 to about 115 angstroms, and most preferably about 80 to about 110 angstroms.

The catalyst also has a narrow pore size distribution about the median pore diameter, that is, at least about 50 percent, preferably at least about 65 percent, and more preferably at least about 75 percent of the total pore volume is in pores distributed over a narrow range of about 20 angstroms above to about 20 angstroms below the median pore diameter. Another porosity feature of the preferred catalyst is the narrow pore size distribution for pores of diameter greater than the median pore diameter. Ordinarily, at least about 40 percent of the total pore volume is in pores of diameter between the median pore diameter and less than about 90 angstroms, preferably less than about 50 angstroms, and most preferably less than about 25 angstroms above the median pore diameter. With respect to small pores, at least about 40 percent of the total pore volume is in pores of diameter between the median pore diameter and less than about 50, and preferably less than about 25 angstroms below the median pore diameter.

In a preferred embodiment, the catalyst has a narrow pore size distribution wherein at least about 60 percent of the total pore volume is in pores of diameter less than 110 angstroms and at least about 70 percent of its total pore volume is in pores of diameter from about 90 to about 120 angstroms, and at least about 60 percent of the total pore volume is in pores of diameter within about 20 angstroms above or below the median pore diameter of the catalyst, as measured by mercury porosimetry. The preferred catalyst has at least 9 percent of the total pore volume in pores of diameter less than 80 angstroms. The preferred catalyst also has less than 25 percent and preferably less than 20 percent of the total pore volume in pores of diameter greater than 115 angstroms. Preferably, the catalyst is essentially free of crystalline support materials, and, more particularly, is essentially free of at least one crystalline molecular sieve.

Other physical properties of the final catalyst typically include a total pore volume of about 0.20 to about 1.0 cc/gram, and preferably about 0.20 to about 0.70 cc/gram and most preferably about 0.25 to about 0.5 cc/gram and a surface area greater than about 100 m²/gram, and preferably between about 100 and 250 m²/gram with both properties determined by the conventional methods previously disclosed herein.

One preferred catalyst employed in the invention contains above 4.1 to about 15 weight percent of nickel components, calculated as NiO, from about 17 to about 40 weight percent of molybdenum components, calculated as MoO₃, and about 0.5 to about 15 weight percent of phosphorus components, calculated as P, on a porous refractory oxide support containing at least about 80 weight percent of gamma alumina. Physical characteristics of this catalyst include a total pore volume of about 0.25 to about 0.50 cc/gram, a surface area from about 100 to about 225 m²/gram and a median pore diameter in the range of about 80 to about 120 angstroms.

A highly preferred catalyst employed in the invention contains about 4.5 to about 13 weight percent of nickel component, calculated as NiO, from about 17 to about 26, and more preferably from about 22 to about 26 weight percent of molybdenum components, calculated as MoO₃, and about 1 to about 10 weight percent of phosphorus components, calculated as P, on a support containing gamma alumina. This catalyst has a surface area from about 125 to about 250 m²/gram, a median pore diameter from about 70 to about 110 angstroms, and a pore size distribution wherein at least about 70 percent of the pore volume is in pores of diameter from about 80 to about 120 angstroms.

Catalysts are activated in accordance with methods suited to a hydrocarbon conversion process, particularly to a hydrodenitrogenation and/or hydrodesulfurization process. Most of the catalysts used in the process of the invention are more active, sometimes even far more active, in a sulfided form than in the oxide form in which they are generally prepared. Accordingly, the catalyst used herein may be sulfided prior to use by any known method (in which case the procedure is termed "presulfiding"), for example, by passing a sulfiding agent in the presence of hydrogen over the catalyst prepared in the calcined form.

If the catalyst is to be used in a sulfided form, it is preferred that a presulfiding procedure be employed. However, since the hydrocarbon conversion process may be employed to upgrade sulfur-containing hydrocarbons (i.e., hydrodesulfurization), one may, as an alternative, accomplish the sulfiding in situ with sulfur-containing hydrocarbon oils, particularly those containing sufficient sulfur to maintain the catalyst in the sulfided form. In another alternative form, the catalyst may be sulfided ex situ by treatment with a sulfur-containing medium prior to loading into a reactor vessel.

Catalysts of the invention may be employed in any of several hydrocarbon conversion processes wherein catalytic composites containing porous support material are known to be catalytically effective. Typical processes include hydrogenation, alkylation, polymerization, desulfurization, denitrogenation, demetallation, hydrocracking, mild hydrocracking, isomerization, reforming, and the like.

The term "hydrocarbon conversion" refers to any reaction wherein a hydrocarbon compound changes chemical composition. As used herein, "hydrocarbon" refers to any compound which consists of hydrogen and carbon, and "hydrocarbon-containing feedstock" refers to any charge stock which contains greater than about 90 weight percent carbon and hydrogen, calculated as the elements. Contemplated for treatment by the process of the invention are hydrocarbon-containing liquids and gases, including broadly all liquid, liquid/vapor and vapor hydrocarbon mixtures including petroleum oils and synthetic crudes. Among the typical feedstocks contemplated are top crudes, vacuum and atmospheric residual fractions, light and heavy atmospheric and vacuum distillate oils, hydrocarbon distillate fractions, shale oils, and oils from bituminous sands and coal compositions and the like. Hydrocarbon compounds converted by the process of the invention include all forms, such as aliphatic, cycloaliphatic, olefinic, acetylenic, aromatic—including alkaryl and arylalkyl aromatic compounds and derivatives thereof—in addition to organometallic, organonitrogen, and organosulfur compounds, particularly those found in conventional hydrocarbon-containing feedstocks. For use herein, typical hydrocarbon oils, or mixtures thereof, may contain at least about 10 volume percent of components normally boiling above about 1,000° F. and in some cases, at least 20 volume percent.

Generally, a substantial proportion (i.e., at least about 90 volume percent) of hydrocarbon feeds, such as gas oils and the like, boil at a temperature less than about 1,100° F., preferably less than about 1,050° F., and usually boil entirely within the range of about 100° F. to about 1,100° F., and most frequently in the range from about 400° F., to about 1,100° F.

Although virtually any high boiling hydrocarbon feedstock may be treated by hydroprocessing with the catalyst of the invention, the process is particularly suited to treating (1) gas oils, preferably light and heavy vacuum gas oils, and (2) heavy residual fractions, especially the treated atmospheric and vacuum residuum oils containing less than about 25 ppmw, preferably less than 5 ppmw and most preferably less than 3 ppmw of contaminant metals (vanadium, nickel, and the like). Sulfur is usually present in the feedstocks in a proportion exceeding 0.1 weight percent and often exceeding 1.0 weight percent. The feedstock contains undesirable proportions of nitrogen, usually in a concentration greater than about 2 ppmw and often between about 2 ppmw and 5,000 ppmw. Ordinarily the feedstock contains less than 200 ppmw of nickel and vanadium contaminant metals, calculated as Ni plus V, with preferred feedstocks containing less than 20 ppmw and most preferably less than 5 ppmw of said materials. The feedstock may contain waxy components, e.g., n-paraffins and slightly-branched paraffins, and thus have a high pour point, e.g., at least about 30° F.

The catalyst may be employed as either a fixed, slurried or fluidized bed (but most usually a fixed bed) of particulates in a suitable reactor vessel wherein a hydrocarbon-containing feedstock (liquid, gaseous, or mixtures thereof) is introduced and subjected to hydrocarbon conversion conditions including an elevated total pressure, temperature, and optionally a hydrogen partial pressure, so as to effect the desired degree of conversion. The feedstock is passed downwardly once through the reactor vessel or maybe recycled therethrough. In some instances, one or more additional reactors may be added to the single reactor, either in series or parallel.

Typical hydrocarbon conversion operation conditions include a temperature from about 50° C. to about 500° C., a pressure from about 50 p.s.i.g. to about 4,000 p.s.i.g., and a liquid hourly space velocity of about 0.05 to about 25 vol/vol-hr. In the presence of hydrogen, the hydrocarbon-containing feedstock contacts the catalyst under hydroprocessing conditions including a hydrogen recycle rate usually about 1,000 to about 15,000, and preferably about 1,000 to about 8,000 standard cubic feet per barrel (scf/bbl). Under such hydroprocessing conditions, the hydrocarbon oil and catalyst are subjected to a hydrogen partial pressure usually in the range from about 100 to about 4,000 p.s.i.g. at a space velocity usually in the range from about 0.05 to about 20 LHSV so as to effect the desired degree of hydroprocessing, as for example, desulfurization and/or denitrogenation.

Typical hydroprocessing conditions that are suitable for hydrodenitrogenation or hydrodesulfurization, or for those processes that yield more than about 10 volume percent conversion of the oil fraction boiling above 1,000° F., to liquid products boiling at or below 1,000° F., are shown in the following Table I:

TABLE I

| Operating Conditions Range | Suitable Range | Preferred |
|---|---|---|
| Temperature, °F. | 500–900 | 600–850 |
| Hydrogen Pressure, p.s.i.g. | 200–4,000 | 500–2,500 |
| Space Velocity, LHSV | 0.05–10 | 0.1–3.0 |
| Hydrogen Recycle Rate, scf/bbl | 590–15,000 | 1,000–10,000 |

Generally, the hydrogen partial pressure maintained during hydroprocessing is more than 50 percent of the total pressure. Usually, for once-through operation, the hydrogen partial pressure is between about 85 and 95 percent of the total pressure while, for recycle operation, the hydrogen partial pressure is somewhat lower, i.e., between 80 and 85 percent of the total pressure.

The hydroprocess of the invention may include either serial or simultaneous desulfurization and denitrogenation of a feedstock. Simultaneous desulfurization, denitrogenation and heavy component (1,000° F. plus components) conversions, as used herein, involves contacting a hydrocarbon oil feedstock with the particulate catalyst disclosed herein under conditions effecting (1) a lower sulfur and nitrogen content in the effluent and/or (2) a higher percentage of liquid products boiling at or below 1,000° F. in the effluent as compared to the feedstock. Serial desulfurization and denitrogenation of a feedstock by contact with the catalyst of the invention involves removing sulfur and nitrogen from the feedstock either prior to or after contact of the feedstock with a catalyst effective for removing a substantial proportion of contaminant metals from the feed.

The invention is further illustrated by the following examples which are illustrative of specific modes of practicing the invention and are not intended as limiting the scope of the invention defined by the appended claims.

EXAMPLE 1

Catalysts A, B and C, prepared in accordance with the invention, are tested under typical hydrodenitrogenation and hydrodesulfurization conditions against a reference commercial hydrodenitrogenation catalyst, Catalyst R, as described hereinbefore, and against two other reference catalysts, Catalysts X and Y, all having characteristics as summarized in Table II.

All the catalysts (except Catalyst R) are prepared with the same amorphous porous refractory oxide support material, i.e., support W, as disclosed in Table A. The catalysts are prepared by extruding a hydrated alumina-containing material through a die. The extruded matter, having a cross-sectional shape of an asymmetrical quadralobe, is dried, broken into particulates and calcined at approximately 1,200° F. for at least one hour in flowing air. The resulting gamma alumina-containing support particulates have a nominal 1/20 inch cross-sectional width and a pore size distribution having at least 80 percent of the total pore volume in pores of diameter from 50 to 90 angstroms.

Catalysts A, B, C and X are prepared as follows:

(A) Four separate 80 ml impregnating solutions are prepared by dissolving into water 15.4 g, 24.6 g, 37.0 g, and 53.0 g of nickel nitrate hexahydrate ($Ni(NO_3)_2 \cdot 6H_2O$) for use in preparing Catalysts X, A, B, and C, respectively.

(B) Four 100 g portions of the above-mentioned gamma alumina-containing support particulates are then pore saturated with the respective 80 ml impregnating solutions. Substantially all 80 ml of each impregnating solution is taken up by each of the 100 g portions of the support particulates.

(C) The four separate impregnated nickel/alumina compositions are each allowed to stand (age) for two hours following which they are oven-dried at 230° F. and then calcined at 1,100° F. for one hour in flowing air to produce calcined nickel/alumina particulates designated as SX, SA, SB and SC, and containing respective nickel oxide (NiO) weight percentages of 3.8, 5.9, 8.7 and 12.0. The calcined particulates, SX, SA, SB and SC, are then employed in the further preparation of Catalysts X, A, B and C, respectively.

(D) Four separate 78 ml impregnating solutions are then prepared by dissolving 44 g of ammonium heptamolybdate (AHM suspended in water) with 16.5 g of 85% phosphoric acid ($H_3PO_4$). The four separate portions of the above-prepared calcined nickel/alumina particulates (SX, SA, SB and SC) are each pore saturated with one of the four 78 ml impregnating solutions containing molybdenum and phosphorus.

(E) The four separate impregnated nickel/molybdenum/phosphorus/alumina compositions are each allowed to stand (age) for 2 hours following which they are oven-dried at 230° F. and then calcined at 800° F. for one hour in flowing air to produce finished catalyst particles having characteristics as summarized in Table II.

Reference Catalyst Y is prepared by pore saturating 100 g of the above-mentioned unimpregnated gamma alumina-containing support particulates with a sufficient amount of an aqueous impregnating solution containing molybdenum, nickel and phosphorus. The impregnating solution contains 379.2 g of $MoO_3$, 61.2 g of NiO and 105.6 g of $P_2O_5$, per 660 ml. The impregnated nickel/molybdenum/phosphorus/alumina composition is allowed to stand (age) for 2 hours following which it is oven-dried at 230° F. and then calcined at 800° F. for one hour in flowing air to produce the finished catalyst having characteristics as summarized in Table II.

All the tested catalysts have a narrow pore size distribution including at least 70 percent of the total pore volume in pores of diameter from 90 angstroms to 120 angstroms, at least 8 percent of the total pore volume in pores of diameter less than 80 angstroms, and less than 30 percent of the pore volume in pores of diameter above 115 angstroms.

All catalysts are individually tested for their activity for hydrodenitrogenation and hydrodesulfurization with a gas oil feedstock (Gravity=22.7 API, basic nitrogen=1343 ppmw, total nitrogen=3270 ppmw and sulfur=1.84 wt. percent). Each catalyst is pre-sulfided and contacted with the downwardly flowing feedstock in a single-stage, single-pass system with once-through hydrogen. The operating conditions during each run are summarized as follows: 1,400 p.s.i.g. total pressure, 2.0 LHSV, a hydrogen gas rate of 6,000 SCF/bbl and an initial temperature of approximately 720° F. and thereafter that temperature sufficient to effect 99% total nitrogen conversion.

Giving the commercial Catalyst R an arbitrary activity of 100, relative volume activity (i.e., RVA) for each catalyst are determined by standard calculation and tabulated in Table II for hydrodenitrogenation activity based on total nitrogen conversion (i.e., RVA N(t)) and for hydrodesulfurization activity (i.e., RVA S).

TABLE II

| Catalysts | Wt. % $MoO_3$ | Wt. % NiO | Wt. % P | $MoO_3$/NiO Wt. Ratio | RVA N (t) | RVA S |
|---|---|---|---|---|---|---|
| R | 24.5 | 4.0 | 3.0 | 6.1 | 100 | 100 |
| X | 24.0 | 2.6 | 3.0 | 9.2 | 75 | 74 |
| Y | 23.7 | 3.8 | 2.9 | 6.2 | 99 | 103 |
| A | 23.6 | 4.1 | 2.9 | 5.7 | 115 | 142 |
| B | 23.2 | 6.1 | 2.8 | 3.8 | 117 | 112 |
| C | 22.6 | 8.5 | 2.8 | 2.7 | 112 | 114 |

Note:
The weight percentages of NiO contained in calcined nickel/alumina particulates SX, SA, SB, and SC, used to prepare Catalysts X, A, B and C, respectively are 3.8, 5.9, 8.7 and 12.0, respectively.

The data in Table II indicate that Catalysts A, B and C of the invention are clearly more active for both denitrogenating and desulfurizing a typical hydrocarbon-containing feedstock than the reference catalysts. The data evidence the superiority of Catalysts A, B and C containing above 3, preferably above 4, more preferably at least 4.1, and most preferably at least 4.5 weight percent of nickel components (and underbedded nickel components of at least 4.5, and preferably at least 5.9 weight percent) over the reference catalysts containing 4.0 or less weight percent of nickel components (and particularly Catalyst X containing 3.8 weight percent of underbedded nickel components).

These results are surprising considering that all the reference catalysts contain essentially the same or more molybdenum components than the catalysts of the invention. In the comparison of the invention against commercial Catalyst R, the catalysts of the invention show superiority while containing a lower weight percentage of molybdenum components, i.e., about 1 to 2 lower wt. % (as $MoO_3$), and a greater weight percentage of nickel components, i.e., up to at least 4.5 greater wt. % (as NiO). Further, in the comparison of the invention against reference Catalyst Y, prepared with fewer calcinations (and no underbedded nickel components) and containing a comparable weight percentage of molybdenum, the catalysts of the invention show superior activity. Moreover, reference Catalyst X, containing a comparable percentage of molybdenum, but prepared in a similar manner as Catalysts A, B and C with less nickel, exhibits clearly inferior activity compared to the catalysts of the invention.

EXAMPLE 2

Catalyst D, prepared in accordance with the invention, is tested against a reference catalyst, Catalyst O, and reference commercial Catalyst R from Example 1, under the same operating conditions and with additional portions of the gas oil processed in Example 1.

The reference commercial Catalyst R is prepared by the simultaneous impregnation of nickel, molybdenum and phosphorus components onto gamma alumina-containing support particulates having a pore size distribution similar to Support U disclosed in Table A. Such support particulates have a cross-sectional shape of an asymmetrical quadralobe and the extruded precursor is calcined at approximately 1200° F.

Both Catalyst D and reference Catalyst O are prepared with portions of the same support particulates used in the preparation of reference commercial Catalyst R. Catalyst D is prepared in essentially the same manner as Catalyst A of Example 1, except with the different support particulates. Reference Catalyst O is prepared in essentially the same manner as Catalyst D, except the molybdenum and phosphorus components (from AHM and $H_3PO_4$) are initially impregnated onto the support particulates and calcined in the same manner as in steps (A), (B) and (C) of Example 1, and the nickel components ($Ni(NO_3)_2 \cdot 6H_2O$) are subsequently impregnated onto the resulting calcined molybdenum/phosphorus/alumina particulates, then aged, dried and calcined. Reference Catalyst O contains underbedded phosphorus and molybdenum components and an overlayer of nickel components.

The three catalysts each have nominal compositions containing approximately 24–25 weight percent of molybdenum components, calculated as $MoO_3$, approximately 4–7 weight percent of nickel components, calculated as NiO, and approximately 6–8 weight percent of phosphorus components, calculated as $P_2O_5$. All the tested catalysts have a narrow pore size distribution including at least 65 percent of the total pore volume in pores of diameter from 70 angstroms to 100 angstroms and less than 10 percent of the total pore volume in pores of diameter less than 110 angstroms and a median pore diameter of approximately 90–95 angstroms.

The RVA's for denitrogenation and desulfurization for each catalyst are described below in Table III.

TABLE III

| Catalysts | RVA N (t) | RVA S |
|---|---|---|
| R | 100 | 100 |
| O | 63 | 69 |
| D | 138 | 125 |

The data in Table III indicate that Catalyst D of the invention is more active than the reference catalysts for both denitrogenating and desulfurizing a typical feedstock. Catalyst D, containing underbedded nickel components, is much more active than reference Catalyst O, containing nickel components in the overlayer, and more active than commercial reference Catalyst R, prepared by simultaneous impregnation of nickel, molybdenum and phosphorus onto the support.

FIG. 1 illustrates Raman spectra run on the samples of Catalysts R, O and D with a Spex Ramalog 1403 spectrometer equipped with a cooled RCA GaAs photomultiplier tube. The 488 nanometer line of a model 165 Ar$^+$ ion laser is used to generate Raman scattered light. The laser power impinging on the samples is limited to less than 50 mW. All spectra are obtained with a spectral resolution of 5 cm$^{-1}$. Signal pulses from the photomultiplier tube are passed through a model 1182 amplifier/discriminator (Princeton Applied Research, Princeton, N.J.) and counted by a PC-XT data system using Labcalc software (Galactic Industries, Salem, N.H.). Typically, integration times of 10–15 s is used for data collection. The samples (1 cm wafers), are prepared by grinding in an agate mortar and pestle and pressing under a pressure of about 1,000 psi. Each sample is mounted in a spinning sample holder in the spectrometer chamber. The samples are spun at approximately 500 rpm to minimize thermal modifications. The angle between the incident laser beam and the sample surface is 30°.

The Raman spectrum of the catalyst of the invention, as shown in FIG. 1 (bottom), exhibits Raman bands of weak and strong intensity (weak $_{(w)}$ and strong $_{(s)}$) in the regions of approximately 246 cm$^{-1}$$_{(w)}$, 368 cm$^{-1}$$_{(w)}$, 461 cm$^{-1}$$_{(w)}$, 600 cm$^{-1}$$_{(w)}$, 667 cm$^{-1}$$_{(w)}$, 830 cm$^{-1}$$_{(w)}$, 890 cm$^{-1}$$_{(s)}$, 950 cm$^{-1}$$_{(s)}$, 974 cm$^{-1}$$_{(s)}$ and 992 cm$^{-1}$$_{(s)}$ (all±5 cm$^{-1}$). Such a combination of Raman bands characterizes the presence of an underbedded nickel-containing catalyst. Such Raman bands are enhanced and more readily observed in the second derivative plots of such a spectrum. The Raman spectrum for reference commercial Catalyst R exhibits a strong Raman bands at approximately 956 cm$^{-1}$ (see FIG. 1, top), while the spectrum of reference Catalyst O exhibits Raman bands at approximately 243 cm$^{-1}$, 286 cm$^{-1}$, 314 cm$^{-1}$, 335 cm$^{-1}$, 663 cm$^{-1}$, 816 cm$^{-1}$, 949 cm$^{-1}$, 972 cm$^{-1}$ and 993 cm$^{-1}$. The unique combination of Raman bands in the regions of 240 cm$^{-1}$ to about 250 cm$^{-1}$ and 595 cm$^{-1}$ to about 605 cm$^{-1}$, and more particularly, the combination of Raman bands in the regions of 240 cm$^{-1}$ to about 250 cm$^{-1}$, 455 cm$^{-1}$ to about 465 cm$^{-1}$ and 595 cm$^{-1}$ to about 605 cm$^{-1}$, clearly distinguishes the Raman spectra of Catalyst D (also containing at least 3 weight percent of underbedded nickel components) from the combination of Raman bands exhibited by Catalysts R and O which contain essentially no underbedded nickel components.

While particular embodiments of the invention have been described, it will be understood, of course, that the invention is not limited thereto since many obvious modifications can be made, and it is intended to include within this invention any such modifications as will fall within the scope of the invention as defined by the appended claims.

What is claimed is:

1. A catalyst composition comprising a porous refractory oxide, a molybdenum component, a phosphorus component and an underbedded nickel component, said composition characterized by a Raman spectrum comprising at least one Raman band in each of the regions of (1) about 240 cm$^{-1}$ to about 250 cm$^{-1}$, and (2) about 595 cm$^{-1}$ to about 605 cm$^{-1}$.

2. The catalyst composition defined in claim 1 comprising at least one Raman band in the region of about 241 cm$^{-1}$ to about 248 cm$^{-1}$.

3. The catalyst composition defined in claim 1 further comprising at least one Raman band in each of the regions of (1) about 365 cm$^{-1}$ to about 375 cm$^{-1}$ and (2) about 455 cm$^{-1}$ to about 465 cm$^{-1}$.

4. The catalyst composition defined in claim 1 comprising greater than 3 weight percent of total nickel components, calculated as NiO.

5. A catalyst composition comprising an underbedded nickel component, a molybdenum component, a phosphorus component and a porous refractory oxide, said composition characterized by a Raman spectrum comprising Raman bands in each of the regions of (1) about 240 cm$^{-1}$ to about 250 cm$^{-1}$, (2) about 595 cm$^{-1}$ to about 605 cm$^{-1}$, and (3) about 940 cm$^{-1}$ to about 1,025 cm$^{-1}$.

6. The catalyst composition defined in claim 5 consisting essentially of an underbedded nickel component, a molybdenum component, a phosphorus and a porous refractory oxide.

7. The catalyst composition defined in claim 6 wherein said porous refractory oxide contains gamma alumina.

8. The catalyst composition defined in claim 7 comprising greater than 3 weight percent of total nickel components, calculated as NiO.

9. The catalyst composition defined in claim 5 further comprising Raman bands in the regions of (1) about 455 cm$^{-1}$ to about 465 cm$^{-1}$ and (2) about 365 cm$^{-1}$ to about 375 cm$^{-1}$.

10. A catalyst composition comprising a porous refractory oxide, a molybdenum component, a phosphorus component and an underbedded nickel component, said composition characterized by a second derivative of the Raman spectrum of said composition comprising Raman bands in each of the regions of (1) about 240 cm$^{-1}$ to about 250 cm$^{-1}$, and (2) about 595 cm$^{-1}$ to about 605 cm$^{-1}$.

11. The catalyst composition defined in claim 10 further comprising second derivative Raman bands in each of the regions of (1) about 455 cm$^{-1}$ to about 465 cm$^{-1}$ and (2) about 365 cm$^{-1}$ to about 375 cm$^{-1}$.

12. The catalyst composition defined in claim 10 comprising greater than 3 weight percent of total nickel components, calculated as NiO.

13. The catalyst composition defined in claim 10 further comprising at least 3 second derivative Raman bands in the region of about 880 to about 1,025 cm$^{-1}$.

14. The catalyst composition defined in claim 13 further comprising at least one second derivative Raman band in the region of about 880 cm$^{-1}$ to about 900 cm$^{-1}$.

15. The catalyst composition defined in claim 14 further comprising at least one second derivative Raman band in the region of about 970 cm$^{-1}$ to about 980 cm$^{-1}$.

16. The catalyst composition defined in claim 13 further comprising at least one second derivative Raman band in the region of about 984 cm$^{-1}$ to 1010 cm$^{-1}$.

17. A catalyst composition comprising an alumina component, a molybdenum component, a phosphorus component and an underbedded nickel component, said composition characterized by a Raman spectrum comprising at least one Raman band in each of the regions of (1) about 241 cm$^{-1}$ to about 248 cm$^{-1}$, (2) about 595 cm$^{-1}$ to about 605 cm$^{-1}$ and (3) about 455 cm$^{-1}$ to about 465 cm$^{-1}$, and at least two Raman bands in the region of (4) about 940 cm$^{-1}$ to about 1,010 cm$^{-1}$.

18. The catalyst composition in claim 17 wherein said Raman spectrum comprising at least three Raman bands in the region of about 880 cm$^{-1}$ to about 1,010 cm$^{-1}$.

* * * * *